United States Patent [19]

Edgar

[11] Patent Number: 5,619,230
[45] Date of Patent: Apr. 8, 1997

[54] SYSTEM AND METHOD FOR REAL-TIME IMAGE DISPLAY PALETTE MAPPING

[75] Inventor: Albert D. Edgar, Austin, Tex.

[73] Assignee: International Business Machines Corporation, Armonk, N.Y.

[21] Appl. No.: 442,599

[22] Filed: May 17, 1995

Related U.S. Application Data

[63] Continuation of Ser. No. 147,513, Nov. 5, 1993, abandoned.

[51] Int. Cl.$^6$ ........................................... G09G 5/02
[52] U.S. Cl. ........................ 345/150; 345/154; 345/149
[58] Field of Search ..................................... 345/147, 149, 345/148, 150, 152, 153, 154, 155; 358/455, 457, 456, 458, 459, 461, 463; 348/574, 489, 609; 382/162, 163, 165, 167

[56] References Cited

U.S. PATENT DOCUMENTS

| | | | |
|---|---|---|---|
| 4,220,972 | 9/1980 | Geokezas et al. | |
| 4,561,104 | 12/1985 | Martin | |
| 4,680,628 | 7/1987 | Wojcik et al. | |
| 4,730,212 | 3/1988 | Wojcik et al. | |
| 4,758,893 | 7/1988 | Lippel | 358/574 |
| 4,917,097 | 4/1990 | Proudian | |
| 4,956,638 | 9/1990 | Larkey et al. | 345/152 |
| 5,138,303 | 8/1992 | Rupel | 345/150 |
| 5,164,717 | 11/1992 | Wells | 345/149 |
| 5,201,030 | 4/1993 | Carrie | 345/149 |

FOREIGN PATENT DOCUMENTS

| | | |
|---|---|---|
| 0204094 | 12/1986 | European Pat. Off. |
| 0547382 | 6/1993 | European Pat. Off. |
| 2007849 | 1/1970 | France |
| 9010991 | 9/1990 | WIPO |

*Primary Examiner*—Xiao Wu
*Attorney, Agent, or Firm*—Robert M. Carwell

[57] ABSTRACT

A system and method for digital video imaging is provided. Complimentary dither patterns are applied to green and magenta components of the image. The complement nulls out the dither pattern from visual perception. The patterns are applied to permit rapid palette mapping with an improved palette, wherein the number of color states are non-integer powers of two. The dither matrix employed assumes pixels received as 8 bits per color with 7, 9, and 4 states of red, green, and blue, respectively. Green and magenta color components of the image switching out of phase with one another cancel dither frequency from luminance. Chrominance alternatively switches between green and magenta, thereby substituting chrominance noise for luminance noise and also thereby effectively reducing overall perceived image noise. In a preferred embodiment a system and method is provided for mapping a digitized image defined by at least a first and second color component, comprising selecting a dither pattern; selecting a complementary dither pattern; generating an altered first color component from the first color component and the dither pattern; and generating an altered second color component from the second color component and the complementary dither pattern.

14 Claims, 11 Drawing Sheets

| A | A | A | A |
|---|---|---|---|
| A | A | A | A |

FIG. 15A

| A | B | A | B | A | B | A | B |
|---|---|---|---|---|---|---|---|
| C |   | C |   | C |   | C |   |
| A | B | A | B | A | B | A | B |
| C |   | C |   | C |   | C |   |

FIG. 15C

| A | B | A | B | A | B | A | B |
|---|---|---|---|---|---|---|---|
| A | B | A | B | A | B | A | B |

FIG. 15B

| A | B | A | B | A | B | A | B |
|---|---|---|---|---|---|---|---|
| C | D | C | D | C | D | C | D |
| A | B | A | B | A | B | A | B |
| C | D | C | D | C | D | C | D |

SYSTEM AND METHOD FOR REAL-TIME IMAGE DISPLAY PALETTE MAPPING

This is a continuation of application Ser. No. 08/147,513 filed Nov.5, 1993, now abandoned.

TECHNICAL FIELD

This invention relates to full color image display systems and, more particularly, to digital forms of such systems with limited palettes.

BACKGROUND OF THE INVENTION

In the digital video arts, analog images, either stored or live, are electronically "captured" by video digitizing equipment into a series of digital numbers, each corresponding to a different one of a plurality of picture elements or "pixels" which comprise the image. Each such number carries information about the color components which, when combined, comprise the color of the particular pixel.

Due to limited system memory, the number of possible such colors is itself limited to a finite number or "palette" of colors. A digital color monitor is normally provided for converting these number into visible pixels which, in the aggregate, form a digitized video image on the screen corresponding to the analog image.

During the aforementioned capture of video images, the video monitor is used to focus, frame, and adjust color. Only after capture and a long palette mapping procedure can the image be seen on the computer monitor using a color look-up table. The long time required to map an analog image into the finite digital palette precludes the use of the computer monitor as the live monitor. Thus, in prior art procedures, a system operator must own and run both a video monitor and a computer monitor, resulting in unnecessary duplication of hardware expenses. More seriously, however, differences in color between the video and computer monitors are not visible while the image is being adjusted, and most video monitors do not show the edges of the image for accurate framing.

A common problem in image display briefly mentioned above is to "map" a full color image to a printer, display, or memory capable of only a limited number of colors. The process of reducing the image to contain only colors in the aforementioned set of limited colors or "palette" is known in the art as mapping to a palette. A typical digital display:might, for example, have 256 palette colors whereby a single digital byte would represent one pixel in the mapped image.

Figure 4:
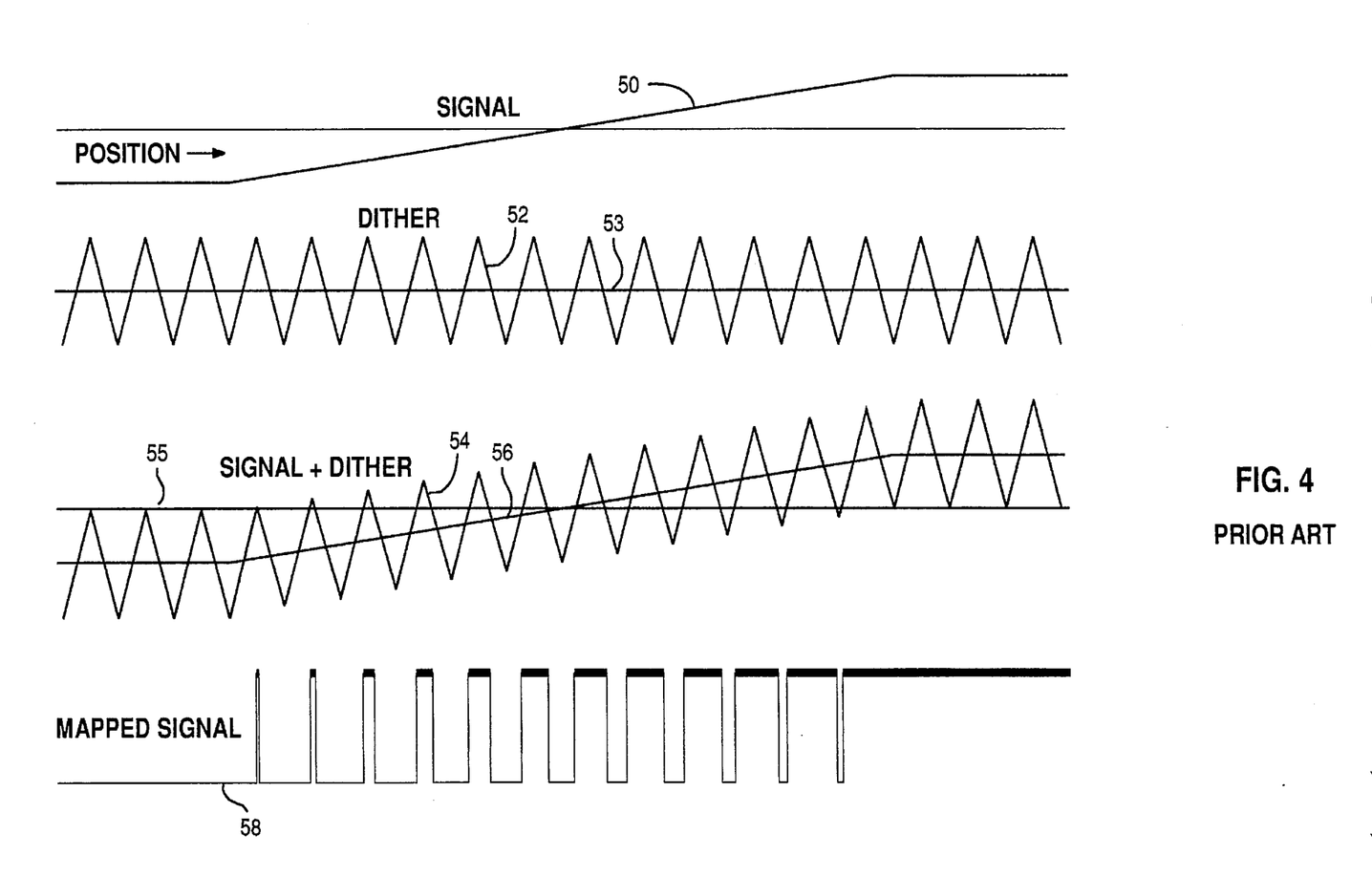
FIG. 4 is an illustration of a dithering technique of the prior art.

Several methods are known in the art for mapping. In one form known as dithering, a dither pattern is added to the pure image, and each pixel of the summed image is rounded to the nearest color in the palette. Turning to FIG. 4, illustrated therein is an example of dithering for the simple case of a single scan line signal 50 of a monochrome image having only two colors in the palette represented by the portion of the waveform 52 above and below the reference line 53, respectively. Dithering effectively alters the "duty cycle" of each color to create the illusion of intermediate colors. A typical application of this technique is in the printing of magazines which employ dithering to make half tone dots simulating shades of gray differing relative proportions of black dots being utilized. Still referring to FIG. 4, by combining the dithered signal 54 (corresponding to dither 52) and the signal 56 (corresponding to signal 50), the additive combination thereof corresponding to the portion of dither 54 biased upwards by the signal 56 may be seen to be the portion of dither 54 extending above the reference line 55. This resulting mapped signal is thus seen depicted as signal 58 in FIG. 4.

Figure 5:
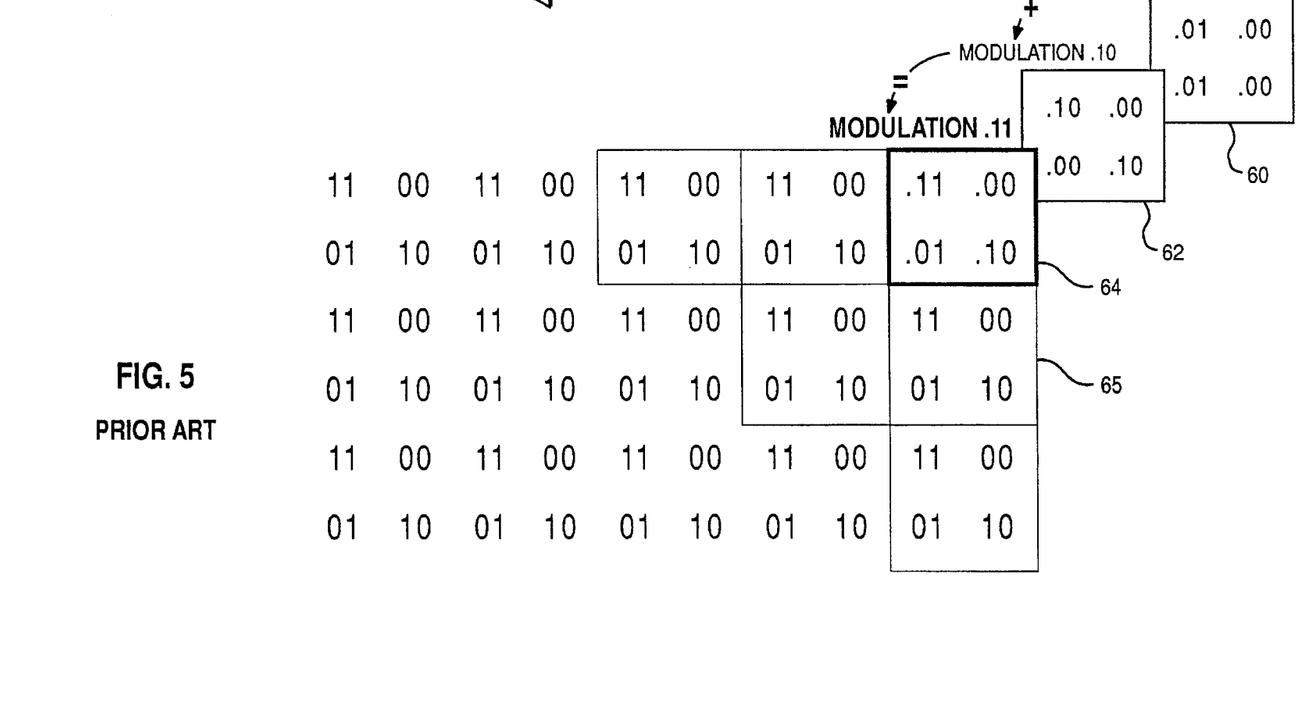
FIG. 5 is an illustration of a representative dither pattern and matrix of the prior art.

Different dither patterns were known in the prior art. In two dimensions, such a dither pattern usually consisted of a dither matrix which repeated through the image. Turning to FIG. 5 now, if this dither matrix 60 or 62 has four elements, the dither can add two bits to the effective gray scale, as shown therein. Thus, as an example, an additive modulation of 0.01 in matrix 60 (upper left corner) with modulation 0.10 (upper left corner) in matrix 62 results in a net modulation of 0.11 (upper left corner) in matrix 64 which may be seen to be one of the four element matrixes of the overall image matrix 65 after having been modulated by matrices 60 and 62. It can be shown that if the dither matrix such as matrix 60 has 16 elements, it can add 4 bits. These bits are to the right of the binary point, wherein unity is the step between discrete colors in the palette.

The least noticeable pattern for dithering typically is a checkerboard because the sampling noise is at the diagonal extremes of the spatial frequency bandwidth. The most significant bit of dither is therefore assigned to the checkerboard pattern. For cathode ray tube or "CRT" displays, the next least noticeable pattern has been found to be a vertical stripe so the next bit is assigned to vertical stripes as portrayed in FIG. 5.

The problem with prior art dither techniques is that the dither pattern itself distracted from the image. On a digital image monitor, which normally has limited resolution, the dither pattern provided a major distraction preventing the use of the image for focusing or aligning fine detail.

Prior methods of palette mapping have been provided in the art to improve image color utilizing various well known techniques such as error diffusion. Although they may provide desired improvements in full color imaging, the mapping techniques were so computationally complex as to render them of little practical use in many applications wherein time was not available after the initial image capture for the processing and subsequent viewing of the image to determine if it was captured correctly in the first place. In other words it was not possible to adjust the image and compensate for differences in color in computer monitors in real-time whereby the computer monitor itself could actually be utilized to focus, frame, and adjust color as well as for final display and use of the image.

Accordingly, in the prior art, with a digital image display using mapped images, it was not possible to achieve both the required quality and the required speed at the same time to use the display as a real-time monitor. The subject invention solves this problem by providing a dither system in which the technique employed reduces the aforementioned visual distraction.

Figure 6:
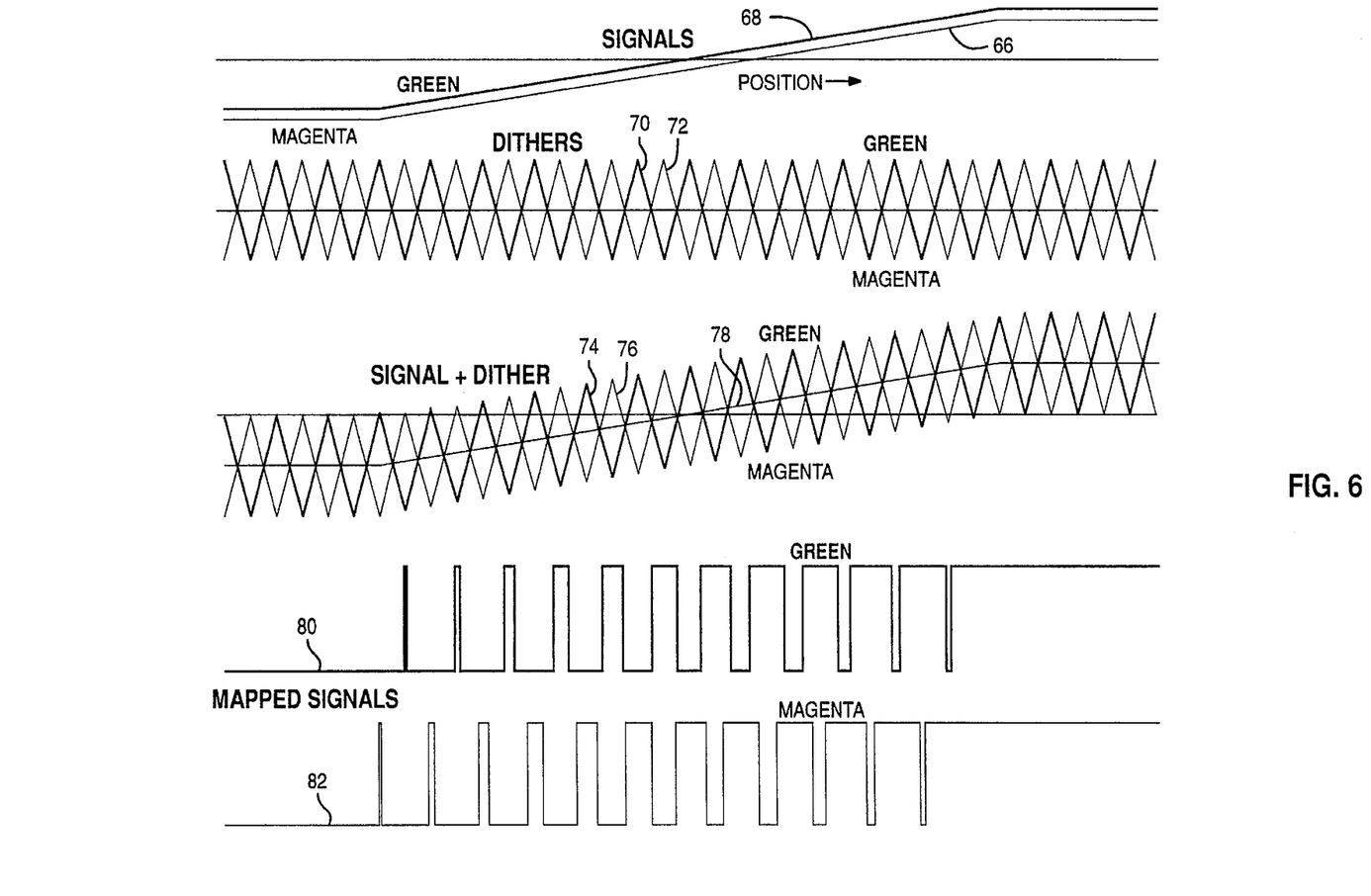
FIG. 6 is an illustration of the dithering technique as employed with the subject invention.

Turning now to FIG. 6, similar to FIG. 4, there is shown a magenta and green single scan line, respectively. In accordance with techniques of the present invention for reasons hereinafter described, dithering is provided for these green and magenta colors shown as waveforms 70 and 72. In like manner to FIG. 4, the combination of the signals 66, 68, and the corresponding dithers 70, 72 shown as signal 78 and dithers 74, 76, resulted in corresponding green and magenta mapped signals 80, 82, respectively. In a color image, prior art however only applied this dither to the red, green, and blue planes. In contrast, the invention applies the same pattern matrix to red and blue, and the complement to green for reasons that will be hereinafter described in detail.

Figure 7:
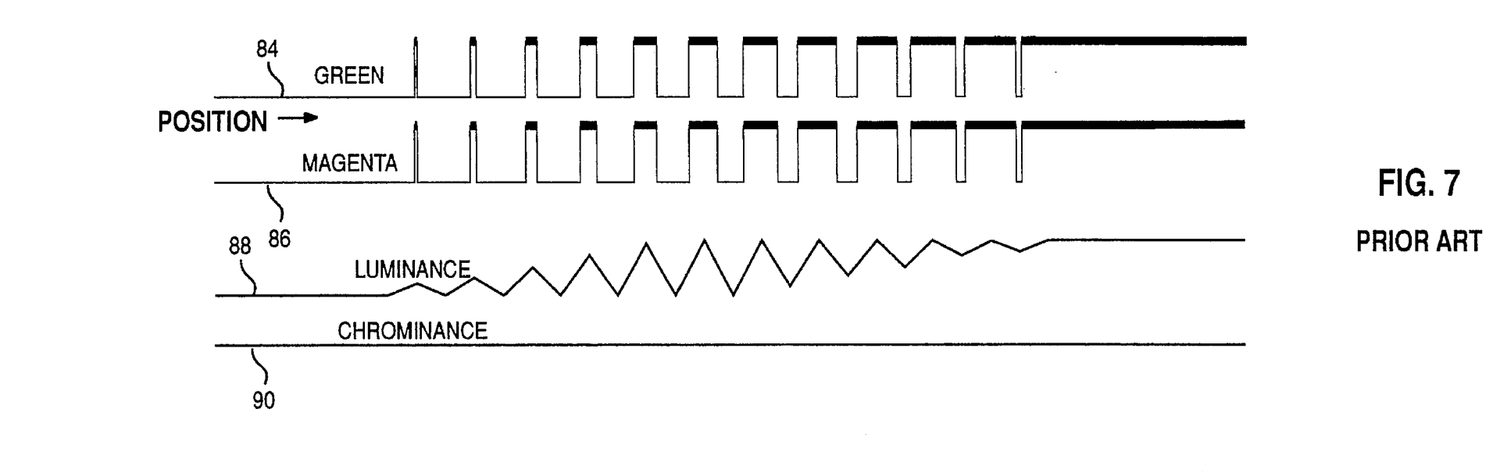
FIG. 7 is a schematic illustration of dithering technique of the prior art illustrating the resulting increase in luminance noise.
Figure 8:
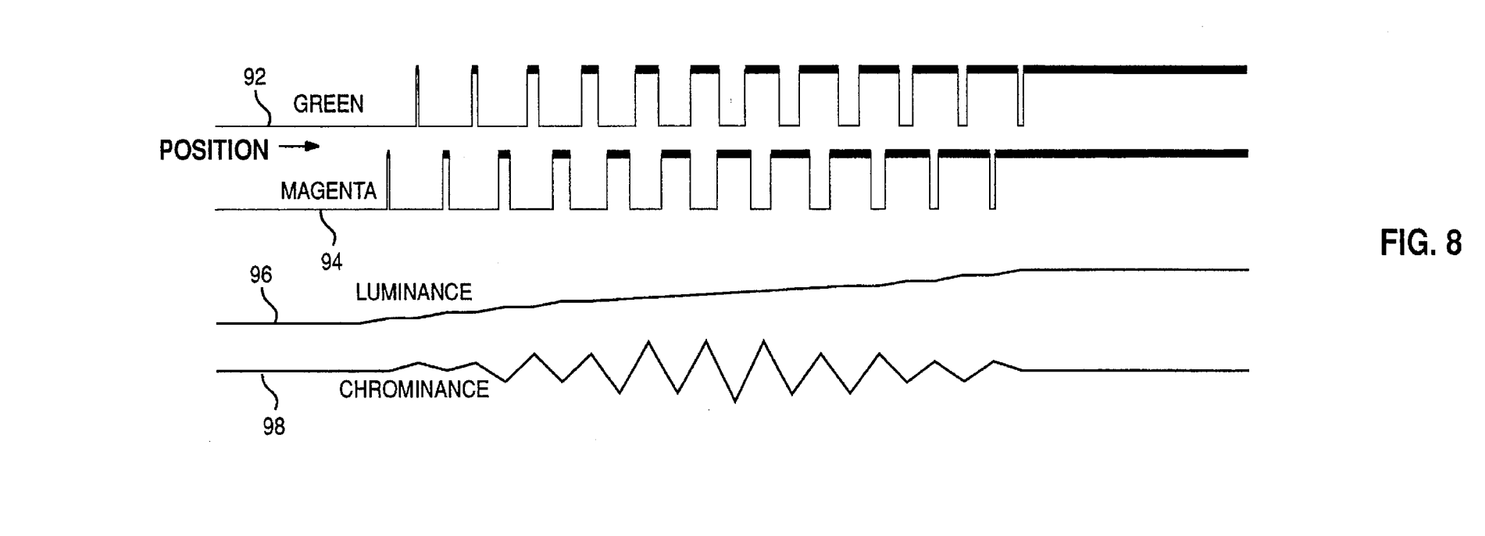
FIG. 8 is an illustration of dithering technique in accordance with the present invention indicating the cancelling of dither frequency from the luminance and reduction in luminance noise.

Referring now to FIG. 8 in contrast to FIG. 7, in accordance with the invention the green and magenta signals 92, 94, respectively, would switch out of phase with each other, thereby cancelling the dither frequency from the luminance 96, thereby removing the dither pattern distraction from luminance. The chrominance or color, on the other hand now switches between green and magenta as shown by chrominance signal 98. Thus it may be seen that the complementary dither trades luminance noise for chrominance noise.

Turning now to FIG. 7, in the prior art, if the original image was a gray scale, then the green and magenta colors would turn on and off together in phase, represented by waveforms 84 and 86, respectively. As a result, there would be no deviation in chrominance or color at all, as shown by waveform 90. However, the luminance would switch at the dither frequency, shown as luminance waveform 88, thereby producing the familiar half tone dot pattern common to dither techniques.

Figure 9:
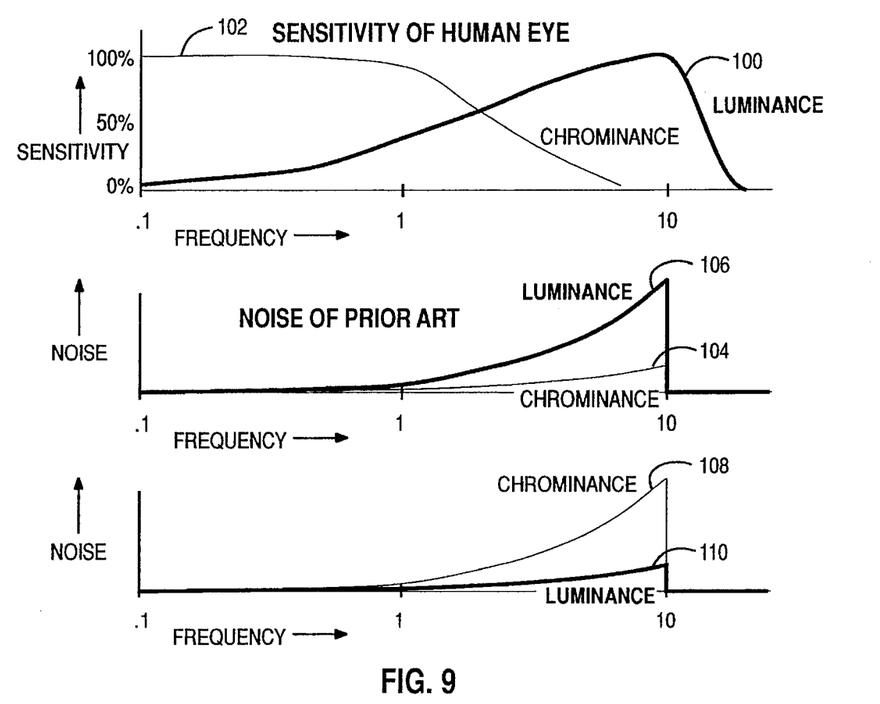
FIG. 9 is a series of plots comparing eye sensitivity in luminance, and chrominance noise as a function of frequency resulting from prior art dithering and dithering in accordance with the invention.

Referring now to FIG. 9, this tradeoff of FIG. 8 is portrayed relative to the human visual system. Depicted at the top of FIG. 9 is a plot of human eye sensitivity curves. In these plots, a frequency of 10 cycles per degree corresponds to 20 pixels per degree or 20 pixels per 4.43 millimeters viewed at 10 inches, resulting in 640×480 pixels on an IBM model 8515 monitor viewed from 17 inches. Accordingly, the scale and magnitudes shown in FIG. 9 are approximately quantitative and representative of real images.

Still referring to the topmost graph, it will be noted that the resolution of the human eye differs for "color" or chrominance relative to "black and white" or luminance, as shown by the sensitivity graphs 100 for luminance and 102 for chrominance. Effectively one may conclude from the plots that the eye is relatively insensitive to color details.

Referring now to the middle plot of FIG. 9, relative to the luminance and chrominance waveforms 88, 90, respectively, of FIG. 7 in the prior art, it will thus be seen that the luminance noise 106 of the prior art increases substantially with frequency tracking the luminance waveform 88, whereas the chrominance noise 104 increases less substantially, consistent with the chrominance waveform 90 of FIG. 7. Comparing the upper and middle graphs of FIG. 9, it will thereby be apparent that as a result of prior art dithering techniques, because the eye physiologically sees high frequency luminance noise much more effectively than chrominance noise, the perceived noise is greater by employing the prior art techniques. In other words, the sensitivity of the human eye to luminance noise increases with frequency as does the noise resulting from prior art techniques thereby exacerbating the problem. It would thus appear, as will be hereinafter detailed in the description of the preferred embodiment, that trading the high frequency luminance noise for chrominance noise in accordance with the teachings of the invention has been found to provide startlingly favorable results. Because the eye simply does see the high frequency chrominance noise as well, accordingly the perceived noise is greatly reduced.

There is yet another problem associated with prior art approaches briefly mentioned heretofore. It is conventional during the capture of video images for editing and composition purposes prior to arriving at a final image to provide a video monitor for use in real time during the capture process to focus, frame, and adjust color. Due to the long time required to effect palette mapping and associated dithering procedures through color lookup tables and the like just described, this effectively precluded use of the computer monitor itself as the "live monitor" during the capture process for adjusting focusing frame, adjust color, etc.

Accordingly, due to this limitation in prior art procedure precluding use of a digital computer monitor during the capture process, this in turn required that the individual performing the capturing and image adjustment must have access simultaneously to both the video monitor for such capture/editing process and the computer monitor as well.

In addition to the obvious expense of having two monitors associated with prior techniques, even more seriously differences in color representation between the two separate video and computer monitors obviously could not be visible while the image was being adjusted since the adjustment would occur in real time while the video monitor was being employed and the final display would occur thereafter on the computer monitor after mapping from the video monitor display. Additionally, most video monitors do not directly show edges of an image as desired for accurate framing as they would desirable appear on the computer monitor and final image, thereby causing additional problems.

From the foregoing, it will be appreciated that a system and method was needed for palette mapping for digital imagery which would permit display of full color images on hardware with limited palettes. Moreover, improvements in prior art techniques were needed which provided for less perceived noise in the captured image. Still further, it was an object of the invention to provide for improved performance in palette mapping, and to more particularly provide for real time digital imaging with improved palette mapping performance, thereby permitting the Computer monitor to be utilized in real time in the capture and edit process to focus, frame, and adjust color, These and other objects have been fully met by the subject invention, a description of which hereinafter follows which may be more easily understood with reference to the following drawings wherein:

SUMMARY OF THE INVENTION

A system and method for digital video imaging is provided. In a preferred embodiment, complimentary dither patterns are applied to green and magenta components of the image. The complement nulls out the dither pattern from visual perception. The patterns are applied in accordance with the method so as to permit rapid palette mapping with an improved palette, wherein the number of color states are, in one embodiment, non-integer powers of two. The dither matrix employed in the preferred embodiment assumes pixels received as 8 bits per color with 7, 9, and 4 states of red, green, and blue, respectively, in the color palette.

In accordance with the invention, the green and magenta color components of the image switching out of phase with one another cancels dither frequency from luminance. Chrominance alternatively switches between green and magenta, thereby substituting chrominance noise, which the eye is less sensitive to, for luminance noise and also thereby effectively reducing overall perceived image noise.

In a preferred embodiment a system and method is provided for mapping a digitized image defined by at least a first and second color component, comprising selecting a dither pattern; selecting a complementary dither pattern; generating an altered first color component from said first color component and said dither pattern; and generating an altered second component from said second color component and said complementary dither pattern. In the examples, green and magenta are used as the complementary first and second color components. Other combinations, such as red and cyan, are also possible, or three components at three phases, for example red, green, and blue, are possible. In the example, green and magenta are used as the complementary first and second color components. Other combinations such as red and cyan, are also possible, or three components at three phases, for example red, green, and blue, if possible.

DETAILED DESCRIPTION OF THE PREFERRED EMBODIMENT

Figure 1:
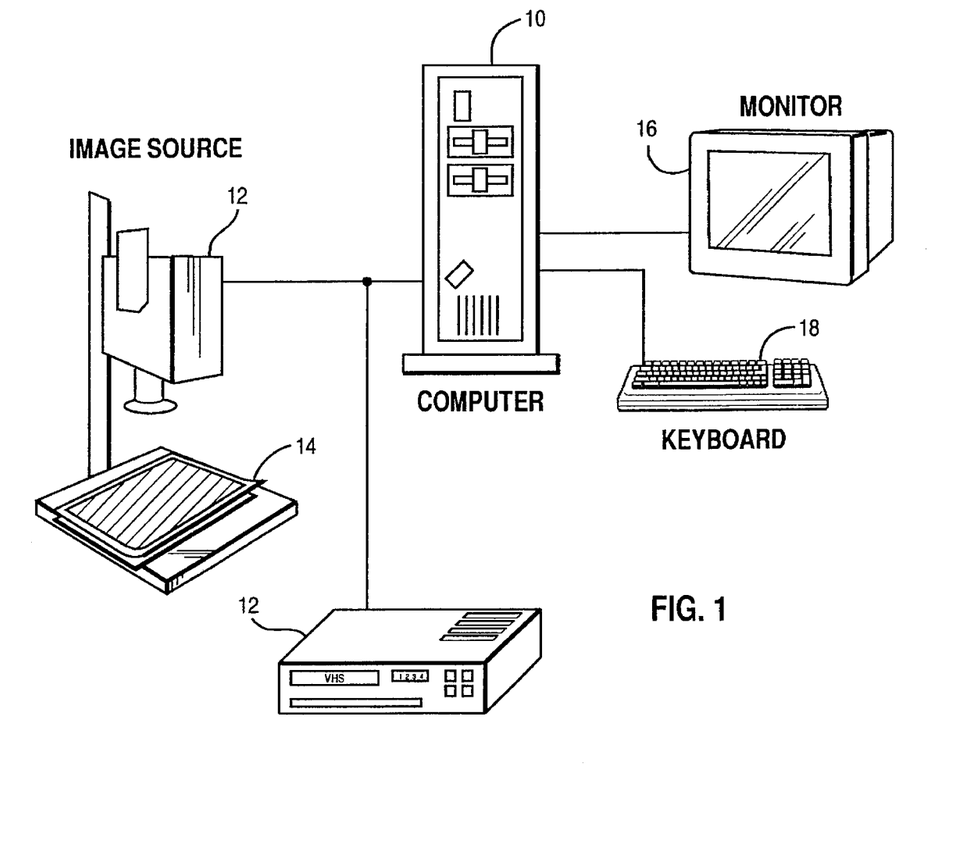
FIG. 1 is an illustration (partially in block diagram form) of a representative computerized system for implementing the system and method of the present invention.

Referring to FIG. 1, a typical system providing the environment for implementing the invention may be seen depicted therein and will first be described. A computer 10, such as a PS/2™ (Trademark of IBM Corporation) system will execute the steps of the invention via a program loaded therein implementing the process to be described. The invention admits to operating upon digital images obtained in a number of manners such as from a live analog video camera or pre-stored digital images.

In the form shown in FIG. 1, a digital capture process is illustrated. The computer will first capture, by means of an appropriate source such as camera 12, a scanner or via some other medium, an image based upon a source subject 14 which the computer 10 will then digitize for subsequent processing. Alternatively, as aforesaid, the images may have been pre-stored in a video tape recorder as the image source 12 and input into the computer 10. The mapped image created in accordance with the invention may be stored for subsequent display on a conventional monitor 16 for human observation or otherwise stored on media for eventual display. It will be recalled that because of the teachings of the invention described herein, it is now possible to not only display the image thus captured on the computer monitor 16, but to provide in real-time for the adjustment and editing of the image in terms of coloration, framing, focusing and adjustment of color and the like due to the novel efficiency afforded by the palette mapping techniques providing herein. Thus, it is now possible for the computer monitor 16 to serve the purpose of both a video monitor during the editing process as well as a computer monitor, thereby avoiding the unnecessary duplication of hardware expenses. A conventional keyboard 18 and other I/O and user-interface devices will further be provided to the computer 10 for interacting to effect the invention.

Figure 2:
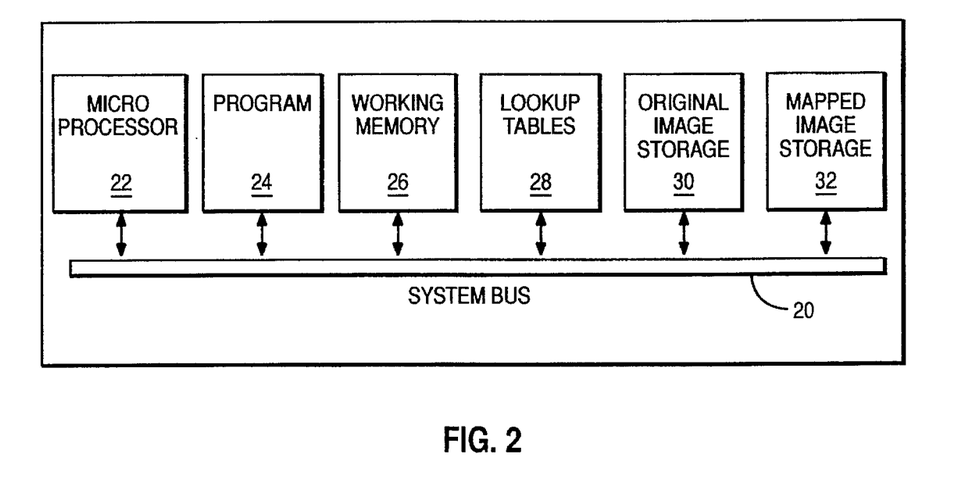
FIG. 2 is a schematic block diagram of subcomponents of the computer portion of the system of FIG. 1.

Referring now to FIG. 2, inside the computer 10, a system bus 20 is provided which ties together the central processing unit or microprocessor 22 and a computer program 24 to be hereinafter described which instructs the microprocessor 22 to execute steps for effecting the invention. Working memory 26 is also provided which the microprocessor 22 utilizes to store intermediate calculations, various lookup tables (generally represented at reference numeral 28), the original stored image 30 captured and stored in digital form by the camera 12, and a form of the image stored in digital format as mapped image storage 32 in accordance with the invention.

Referring again to FIG. 5, it will be recalled that, as is well known in the prior art, dither patterns or matrices such as those shown in reference numerals 60, 62, 64 have been provided Which may be applied to the digitized image matrix 65.

Regarding FIG. 5, it has been found empirically that a preferred pattern for the next two bits repeats the same patterns at half the frequency. This accordingly will reduce the noise by a factor of ¼ every time the frequency is reduce by ½ as will be hereinafter described in more detail.

As was previously described with respect to FIG. 7, wherein the original image was grayscaled, green and magenta would turn on and off in phase with no deviation in color, and with the luminance switching at the dither frequency. In contrast, in accordance with the invention, referring now to FIGS. 6 and 8, it is a feature of the invention that the green and magenta colors will switch out of phase with one another, thereby cancelling the dither frequency from the luminance. This out of phase switching may be seen with reference to the green and magenta signals 80, 82 in FIG. 6 and 90, 94 in FIG. 8. Moreover, also referring to FIG. 8, it will be seen that in accordance with the invention it is the chrominance or color 98, which now switches between green and magenta as contrasted with the luminance 96, as shown in the prior art of FIG. 7. In essence, the invention is thereby "trading" luminance noise for chrominance noise.

Figure 10:
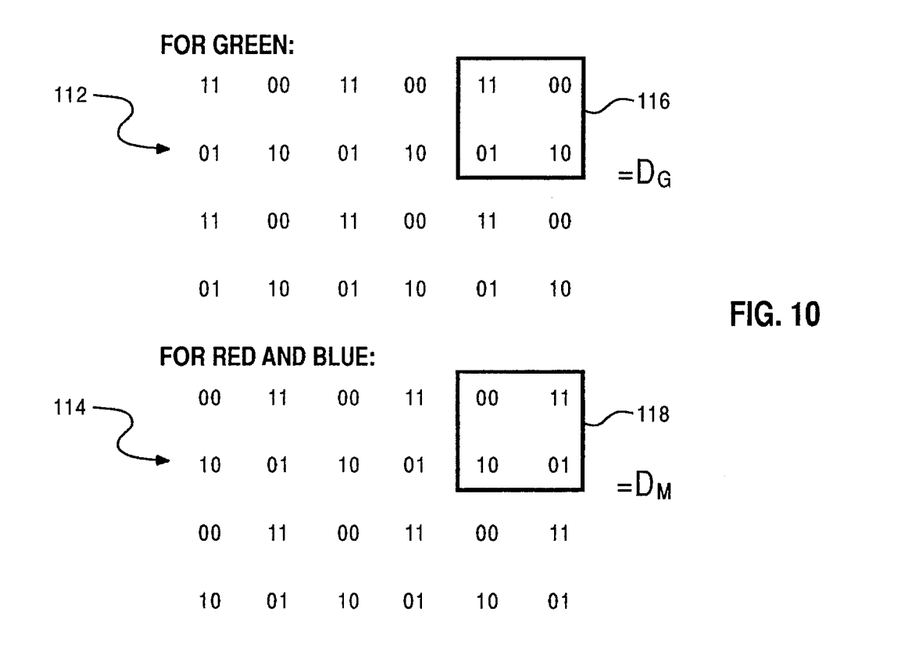
FIG. 10 is an illustration of a representative dithering matrix employed in accordance with the invention.

Referring now to FIG. 10, there is shown an illustrative multiple dithering matrix scheme in accordance with the invention comprised of a green and a red-blue (e.g. magenta) matrix.

In accordance with the invention, the green and magenta colors were selected for at least two reasons. First, the eye is less sensitive to high frequency noise in the green-magenta axis than it is in the orange-cyan axis. Secondly, the green and magenta records are similar in luminance. Actually green is nominally on the order of 59% and magenta 41% luminance. However, more states will be employed in the green rather than in the red and blue in accordance with the invention hereinafter to reduce the absolute magnitude of green dither so that the two in practice are more nearly in balance.

Figure 11:
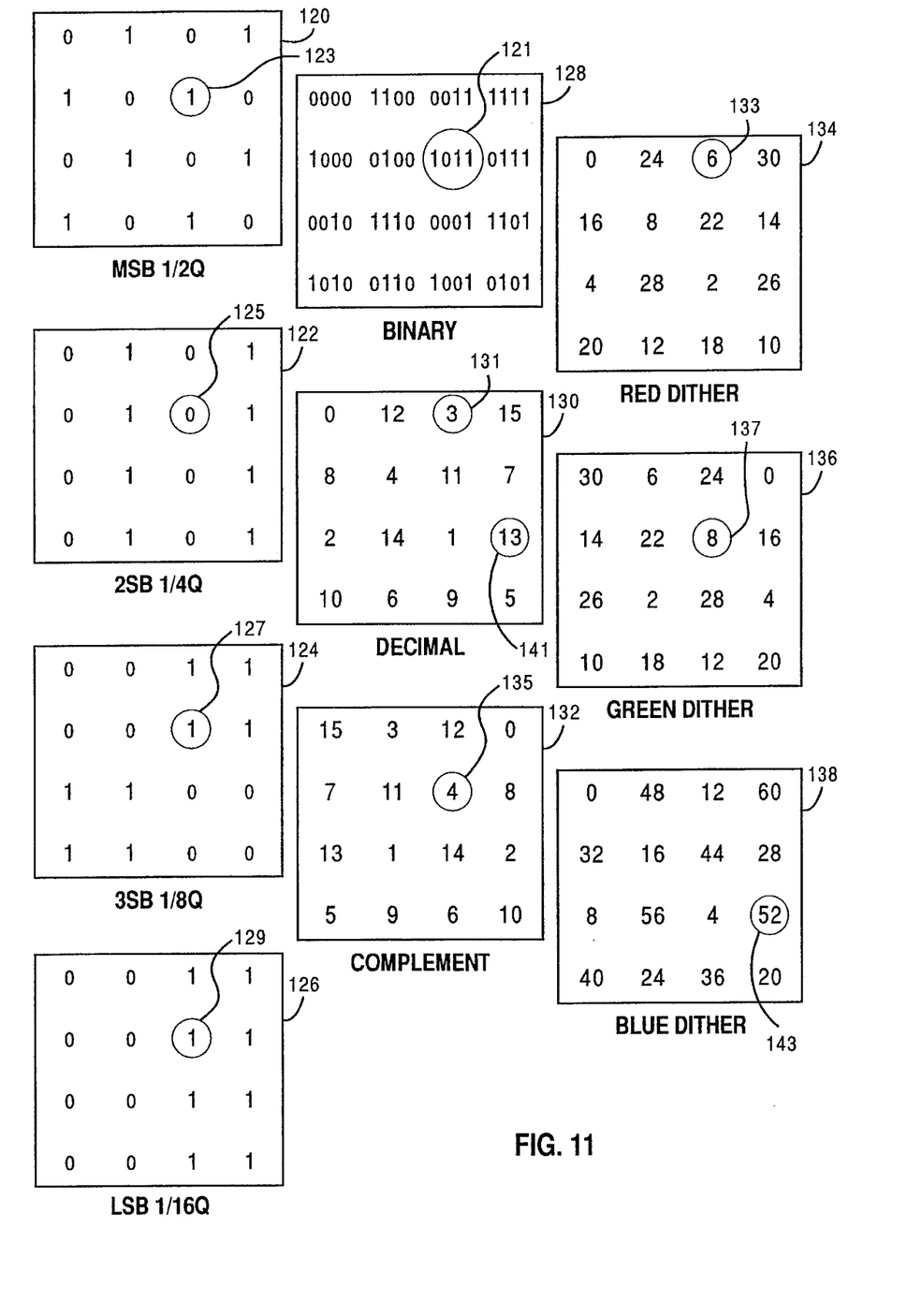
FIG. 11 is a specific example of dithering in accordance with the invention.

With reference to FIG. 11, representative dither matrices used in a preferred embodiment of the invention are shown therein. The representative numbers assume pixels are being received as 8 bits per color and that there are 7 states of red, 9 of green, and 4 of blue in the palette.

A good alternative to the matrices shown therein employs three separately phased dither matrices for each of the three colors. When using a palette wherein the quantum stepsize is visibly balanced for each color, 3 dither matrices may be utilized which are mutually 120degrees out of phase with each other. For other weightings, each color component may be considered as a vector with a length equal to the product of the visual weight of that color and the quantum stepsize (e.g. one less than the number of states available for that color in the palette). The phases of the dither matrices determine the angle of the color vectors, with the phases being selected so as to cancel the vectors.

Referring now to FIG. 11 in more detail, in the left hand column, matrices 120–126 depict four dither patterns for bits ranging from the pattern for the most significant bit at reference numeral 120 to that of the least significant bit as reference numeral 126. The pattern for matrix 120 will be recognized to be the familiar checkerboard pattern, with the second bit at reference 122, being provided in a vertical bar dither pattern appropriate to horizontal scan monitors. Similarly, the third dither pattern at reference numeral 124 is again in a larger checkerboard pattern, and finally the last dither matrix 126 is in a larger vertical bar pattern.

Shown in the binary matrix 128 is a matrix comprised of a plurality of digital words, each bit of a given word being derived from a corresponding one of the matrices, 120–126. For example, referring to the digital word "1011" at reference numeral 121 of matrix 128, the first or "1" bit of the word may be seen to have been derived from the bit in the bit pattern of matrix 120 located in the same spatial position, shown in matrix 120 as bit 123. Similarly, the second bit in the word 121 of matrix 128, e.g. the "0" of the "1011" word may be seen to correspond to the bit "0" shown at reference numeral 125 of matrix 122, again in the same spatial position as the "1011" word 121 at reference numeral 128. In like manner, the third bit of the "1011" word, e.g. "1" will be seen to correspond to the bit "1" at reference numeral 127 of matrix 124, and finally, the last or "1" bit of the "1011" word will be seen correspond to the least significant bit shown at reference numeral 129, e.g. a "1" of matrix 126.

A comparison of the matrix. 130 with that of 128 will reveal that matrix 130 is simply the decimal equivalent to each of the words shown in matrix 128. Similarly, comparing 132 with matrix 130, each of the values in a pixel location in the matrix 132 will be seen to be the complement of that shown in a corresponding position in the matrix 130, e.g. the value for a pixel at a given location in the matrix 132 when summed with a corresponding pixel at a corresponding location in the decimal matrix 130 will always sum to 15.

If an input red or green value has 8 bits or 256states and the palette has only 8 states, there will be 256 states divided by 8 states, or 32 states required to be spanned by the dither matrix for red and green. Similarly there will be 256 states divided by 4 states, or 64 states required to be spanned by the dither matrix for blue to utilize an 8-8-4 palette.

Continuing with FIG. 11, resulting red, green, and blue dither patterns 134, 136, and 138 to use the 8-8-4palette are shown. The red dither pattern 132 will be seen to be the decimal matrix 130 replicated therein for each pixel value in the decimal matrix 130, a corresponding pixel in the red dither matrix 134 appears which is a multiple of two for the value at the same position in the decimal matrix 130. For example, the value "3" at reference numeral 131 in the matrix 130 now becomes 3×2=6, shown at reference numeral 133 of matrix 134. Similarly, the green dither values for each pixel in the green dither matrix 136 may be seen to be twice the corresponding value of the corresponding pixel in the same location in the complement matrix 132. For example, the value "4" at reference numeral 135 of matrix 132 becomes 4×2=9 shown at reference numeral 137 of green dither matrix 136. Finally, the values in the blue dither matrix 138 will be seen to be four times the corresponding location of the decimal matrix 130, such that the value "13" at reference numeral 141 of the decimal matrix 130 becomes 13×4=52 shown at reference numeral 143 of matrix 138.

Figures 12, 13:
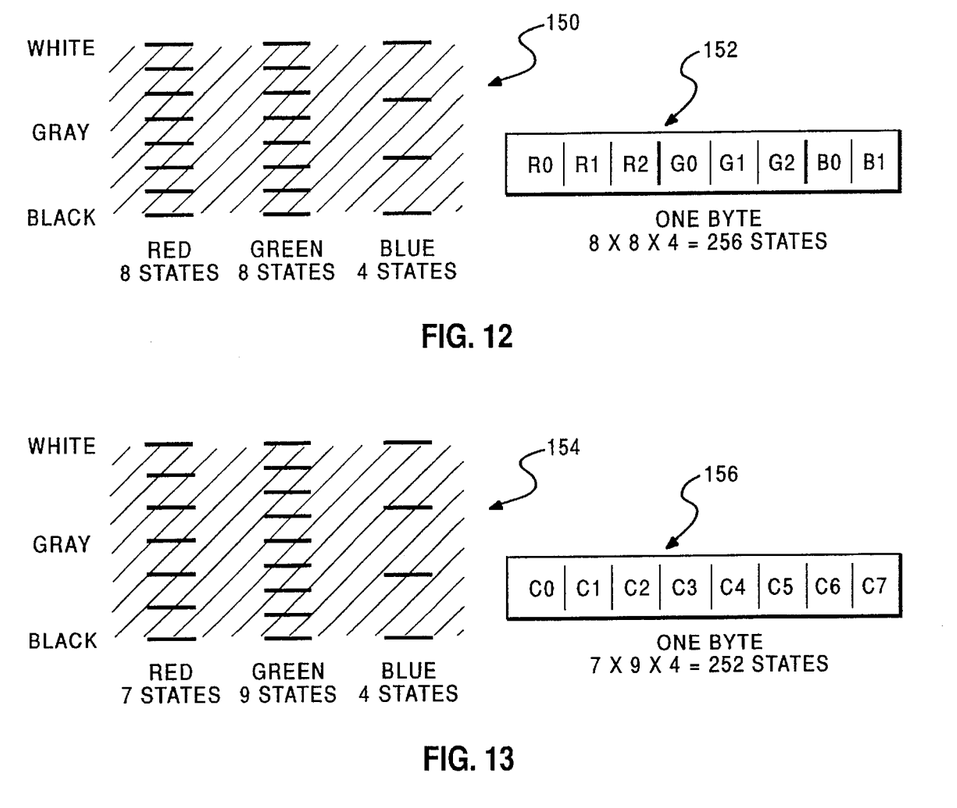
FIG. 12 is an illustration of a common 8 bit, 256 state RGB color palette.
FIG. 13 is an illustration of another preferred 8 bit palette having 252 states

Referring now to FIG. 12, q common 8 bit, 256 state palette 150 is shown therein with a representative 8 bit byte, 152. The palette assigned 3 bits to red, 3 bits to green, and 2 bits to blue, Accordingly, as shown in the illustration 150, there are resulting 8 states for red and green respectively and 4 states for blue.

If it is assumed that one of the 8 states for red and green and 4 states for blue is pure black and one is pure white, and the other states are uniformly distributed, this means that the quantum stepsize, and hence the noise and desired magnitude of dither, is ⅐ of the full range for red and green and ⅓of the full range for blue, and not ⅛.

The visual noise of this palette for graytones is proportional to the square root taken of the sum of the following: the quantum stepsize, weighted according to the visual sensitivity for each color, squared and summed across all colors. The equivalent number of colors in a palette is proportional to the cube of the reciprocal of this noise. Because color space is three dimensional, to halve the noise across all colors requires 8 times the palette size.

Referring now to FIG. 13, it will be apparent that the palette 154 represented therein, in comparison to that of FIG. 12, has more states of green and fewer of red, e.g. 9 green and 7 red. This is called a 7-9-4 palette. The total states fit within the 256 color limit of a single-byte 156 palette, however. The noise is equivalent to a larger 300 color palette with colors allocated proportionally to the one shown in FIG. 12. Although this is not an optimal palette utilizing the relationship described in the previous paragraph, by retaining more states in red than ideal it has been found that warm colors including fleshtones have been more effectively implemented. It will also be noted that in accordance with the prior art, use of a palette wherein the number of states were not powers of 2, such as that of FIG. 13, required difficult calculations. The present invention, however, has addressed this difficult problem by means of the system and method hereinafter described with reference to FIGS. 14 and 15.

Figure 14:
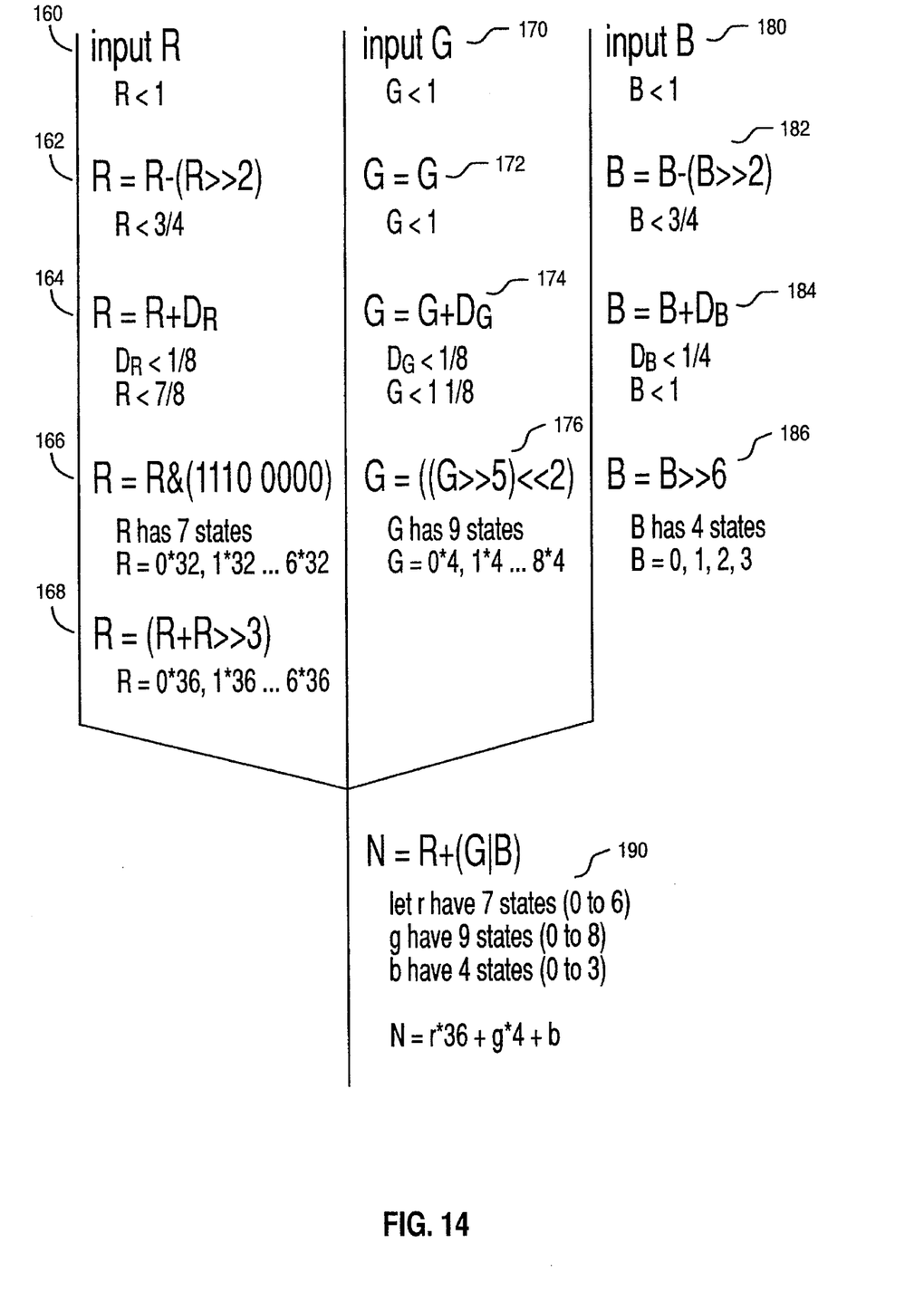
FIG. 14 is one form of a flow diagram of a representative process in accordance with the invention for effecting dithering.

First, with respect to FIG. 14, an 8 bit byte comprised of red, green, and blue (RGB) components, 160, 70, and 180, are shown as being received. The operation shown in FIG. 14 will be repeated for each pixel in an input image. These pixels will be retrieved by accessing successively each row and each column of the image. Each pixel retrieved at a particular row and a particular column yields the three color values R, G, and B, 160, 170 and 180, respectively.

If 256 is defined as unity (i.e. fixed point arithmetic with the binary point 8-bits to the left), accordingly values for all such RGB color components will of course be less than 1, as shown. Next, as shown by steps 162, 172, and 182, the relative quantum stepsize is aligned to a 192-256-192 palette using a shift and subtract technique well known in the art. The dither is next then added to each color from the dither tables hereinbefore described as shown in reference numerals 164, 174, and 184. Note that the dither range "D" for red and green is ⅛.⅛ of 256 is 32, the effective range of dither matrices 134 and 136 of FIG. 11. Similarly, the dither range "D" for blue is ¼.¼ of 256 is 64, the range of the blue dither pattern 138 of FIG. 11. After adding these patterns, the range of each color is extended up to ¾+⅛=⅞ for red, 1+⅛=1⅛ for green, and ¾+¼=1 for blue. It will be noted that the value after dither for green may exceed unity (256) such that the necessary arithmetic should be done in 16 bit format.

The dither pattern $D_R$, $D_G$, and $D_B$ are the dither patterns 134, 136, and 138 from FIG. 11. The correct number is taken from each of these patterns by (1) receiving the row number of the current pixel containing R, G, and B;

(2) taking the remainder of the row number after dividing by 4;

(3) using that remainder as a pointer to one of the 4 rows in the dither matrix, and (4) receiving the column number, finding the remainder after dividing by 4, and using that remainder to point to the dither matrix column.

The magnitudes in the explanations of the remaining steps 166–190 will again interpret values as integer, so that unity will be 256 and ⅞ will be 224, i.e. the binary point is moved 8 bits to the right.

Step 166 masks only the three most significant bits of the red number. Since red took on values from 0 to ⅞ (0 to 224 integer), after this masking R can take on one of 7 states, varying from 0.32 to 6.32 as shown. Step 168 separates these 7 states by 36 counts, as shown.

Similarly, step 176 allows green to take one of 9 states from 0.4 to 8.4, and step 186 lets blue take on one of 4 states from 0 to 3. Finally, step 190 merges red, green, and blue to yield a pointer N into the 7-9-4 palette.

The example just given used a common dither pattern for the red and blue components. A palette, such as a 6-10-4 palette, in which the states are allocated so each step in each color gives approximately the same visual effect, would not cancel luminance distraction if any two of the three colors share a common dither pattern. Such a palette would require not 2, but 3 dither patterns that mutually summed so as to cancel all patterns. An example of such patterns would be 3 sine waves mutually 120 degrees out of phase with each other such that the sum of all 3 was a constant.

Now that an overview of the system and method of invention has been provided, a more detailed explanation of aspects thereof will be hereinafter provided.

In a simple RGB palette there are S=8 states for red and green, and S=4 states for blue. A slightly better 252 color palette has S=7 states for red, S=9 states for green, and S=4 states for blue. In this "7-9-4" palette, let PN stand for "palette number", let R, G, and B vary from 0.0 to 1.0, and let IR, IG, and IB be the equivalent integer values. Then, it can be shown that empirically

| PN=(int) (B*3.99)+(int)(G*8.99)*4+(int)(R*6.99)*4*9 | |
|---|---|
| or: | |
| IR=PN/4/9 | R=(float)IR/6.0 |
| IG=(PN-IR*4*9)/4 | G=(float)IG/8.0 |
| IB=(PN-IR*4*9-1G*4) | B=(float)IB/3.0 |

With the cycle dither, there are more displayable states than palette states as shown by:

$$J=((S-1)*C)+1$$

(Integer arithmetic)

For 4 pels in a dither cycle this relationship may be expressed in a lookup table as follows:

TABLE 1

| | C = 4 pels in cycle | | | |
|---|---|---|---|---|
| | 3 | 3 | 3 | 3 |
| J = 13 | 2 | 3 | 3 | 3 |
| display states | 2 | 2 | 3 | 3 |
| | 2 | 2 | 2 | 3 |
| | 2 | 2 | 2 | 2 |
| | 1 | 2 | 2 | 2 |
| | 1 | 1 | 2 | 2 |
| | 1 | 1 | 1 | 2 |
| | 1 | 1 | 1 | 1 |
| | 0 | 1 | 1 | 1 |
| | 0 | 0 | 1 | 1 |
| | 0 | 0 | 0 | 1 |
| | 0 | 0 | 0 | 0 |

In order to precisely show saturation limits, highest and lowest states need to be unique. The rest of the states are uniformly distributed in accordance with the following relationship employing integer arithmetic:

$$M=[N*(J-2))+(K-((J/2)+1))]/ (K-2)$$

With a C=4 pal cycle, and with a 5/6/5 bit RGB capture and a 7-9-4 state palette; the following values will result shown in Table 3:

TABLE 3

| | R | G | B |
|---|---|---|---|
| S | 7 | 9 | 4 |
| K | 32 | 64 | 32 |
| J | 25 | 33 | 13 |

Figure 3:
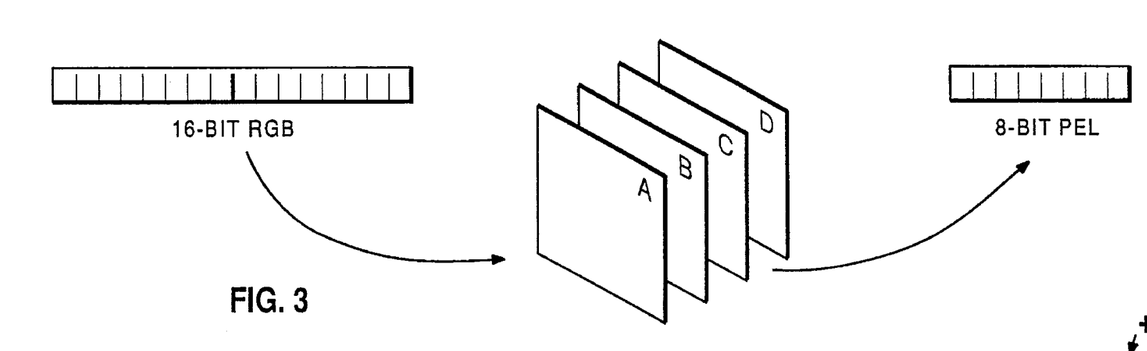
FIG. 3 is an illustration of a 16 bit in 8 bit out multiple lookup table.

All of the foregoing calculations may be neatly stored in C (=4) lookup tables. For each 16-bit RGB pixel, a simple lookup in the appropriate table find the mapped color. One lookup per pixel will thus provide all the necessary mapping with 16-bits in, 8-bits out. This is shown in FIG. 3.

In the 4-cycle dither presented herein, pixels on even rows could alternate between tables A and B, and pixels on odd rows alternate between tables C and D. Table A, for example, represents a dither of "11" applied to green and "00" applied to red and blue.

Figure 15A:
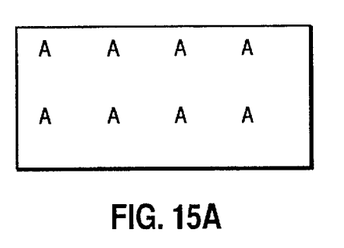
FIGS. 15A–15D are a depiction of a 4-way interlace dithering technique in accordance with the invention for converting pixels in a particular pixel traversal order.
Figure 15B:
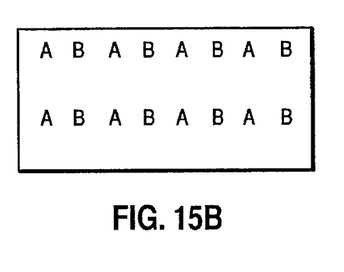
Figure 15C:
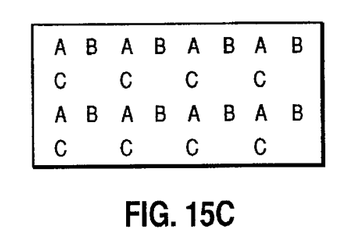
Figure 15D:
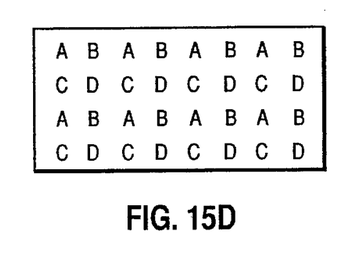

The pixel traversal order in converting an input image to a paletted image may be hardware dependent. If practical, first it is preferable to convert the pixels that use Table A as shown in FIG. 15A. Then with a fresh image from a real time capture camera, those that use Table B would be converted as shown in FIG. 15B. Then with a fresh image, those that use Table C would be converted as shown in FIG. 15C. Finally with a fresh image, those that use table D would be converted as shown in FIG. 15D. This 4-way interlace reduces motion chunkiness by a factor of 4 (and, it will be noted in passing in the Intel architecture, it also reduces segment register moves).

For each pel, the dither "D" is added to the display state, then truncated back to an actual palette state. This may be shown by the following relationship wherein integer arithmetic is employed and S, M, D, and C are as previously defined:

$$S=(M+D)/C$$

Figures 16, 17:
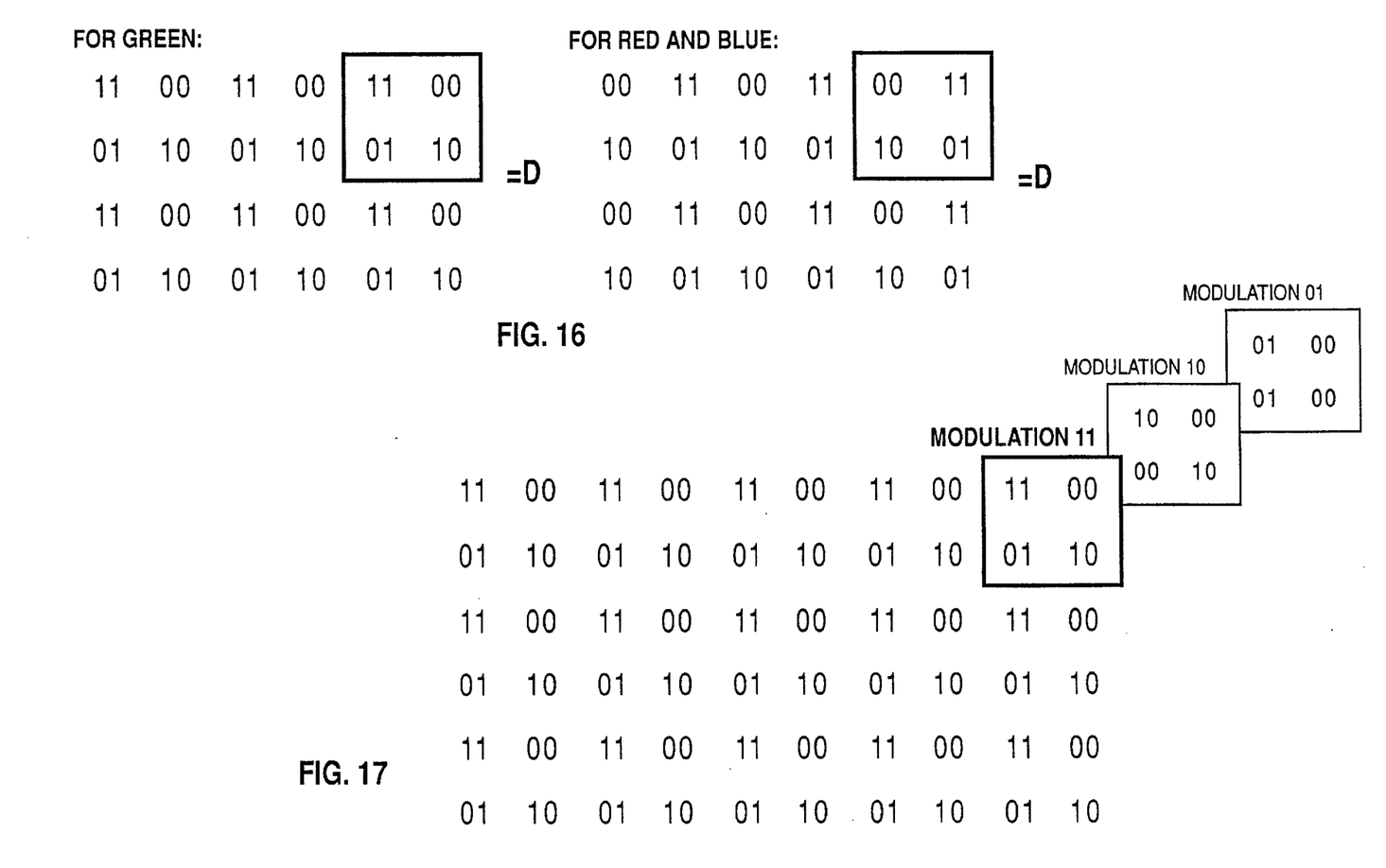
FIG. 16 illustrates representative dithering matrices in accordance with the invention.
FIG. 17 is yet another illustration of a 4-pel-cycle dither matrix in accordance with the invention.

For example, if we let the top left pel have a green value of 17, and assume a 5/6/5 bit RGB and a 7-9-4 state palette and the dither matrix given, the following values will be obtained in Table 2 and FIG. 16.

TABLE 2

| | K = 32<br>captured states | J = 8<br>display states | |
|---|---|---|---|
| | 31 | 7 | |
| | 30 | 6 | |
| | 29 | 6 | |
| | 28 | 6 | |
| | 27 | 6 | |
| | 26 | 6 | |
| | 25 | 6 | |
| | 24 | 5 | |
| | 23 | 5 | |
| | 22 | 5 | |
| | 21 | 5 | |
| | 20 | 4 | |
| | 19 | 4 | |
| | 18 | 4 | |
| | 17 | 4 | |
| | 16 | 4 | |
| | 15 | 3 | |
| N = 14 → | 14 | 3 | ← M = 3 |
| a specific | 13 | 3 | a specific |
| captured state | 12 | 3 | display state |
| | 11 | 3 | |
| | 10 | 2 | |
| | 9 | 2 | |
| | 8 | 2 | |
| | 7 | 2 | |
| | 6 | 2 | |
| | 5 | 1 | |
| | 4 | 1 | |
| | 3 | 1 | |
| | 2 | 1 | |
| | 1 | 1 | |
| | 0 | 0 | |

Complementary dither matrices for red and blue versus green remove the dither from luminance, leaving only random quantification noise. The eye is blind to high frequency color dither, particularly in the green-magenta axis. The 7-9-4 palette has smaller steps in green than in blue or red, nulling luminance to 5%. For example, relative importance of each step is R=0.30/7 G=0.59/9, B+0.11/4 and R+B−G=0.005.

The 4-pel-cycle dither matrix is the sum of a diagonal grid at modulation 0.10 (half an LSB) and a high frequency vertical grid at modulation 0.01 (quarter of an LSD) as may be seen schematically depicted with reference to FIG. 17.

The high frequency vertical grid is substantially blurred by the display without interface flicker, and the larger diagonal grid is almost totally blurred by the display-eye combination.

For critical color accuracy, the value N, previously noted, preferably will be corrected for two effects. First N is converted to the floating point value FN using the relationship indicated in FIG. 20. It will be noted with reference to FIG. 20 that relationships 200 and 202 are preferably expressed in floating point arithmetic. "N" represents desired brightness, and "FN" represents the corrected brightness needed to "fool" a display into admitting the desired brightness. Further, with respect to relationship 200, it will be apparent that variable names apply to range T1 to T2 and the relationship illustrated in FIG. 20 will be employed to solve for FN given N.

All calculations inside the [] are done in floating point using this FN, then rounded back to integer before division by (K-2). The first correction is for the interaction of dither and display gamma. A dither of 31(white) and 0 (black) gives the same brightness as a constant 22, not a constant 15. Thus, dithered shades, particularly in the shadows, need be aimed darker. The second correction compensates for giving saturated white and black unique states, thereby spreading the remaining states sparser. Thus shadows need to be aimed darker and highlights lighter.

Figure 18:
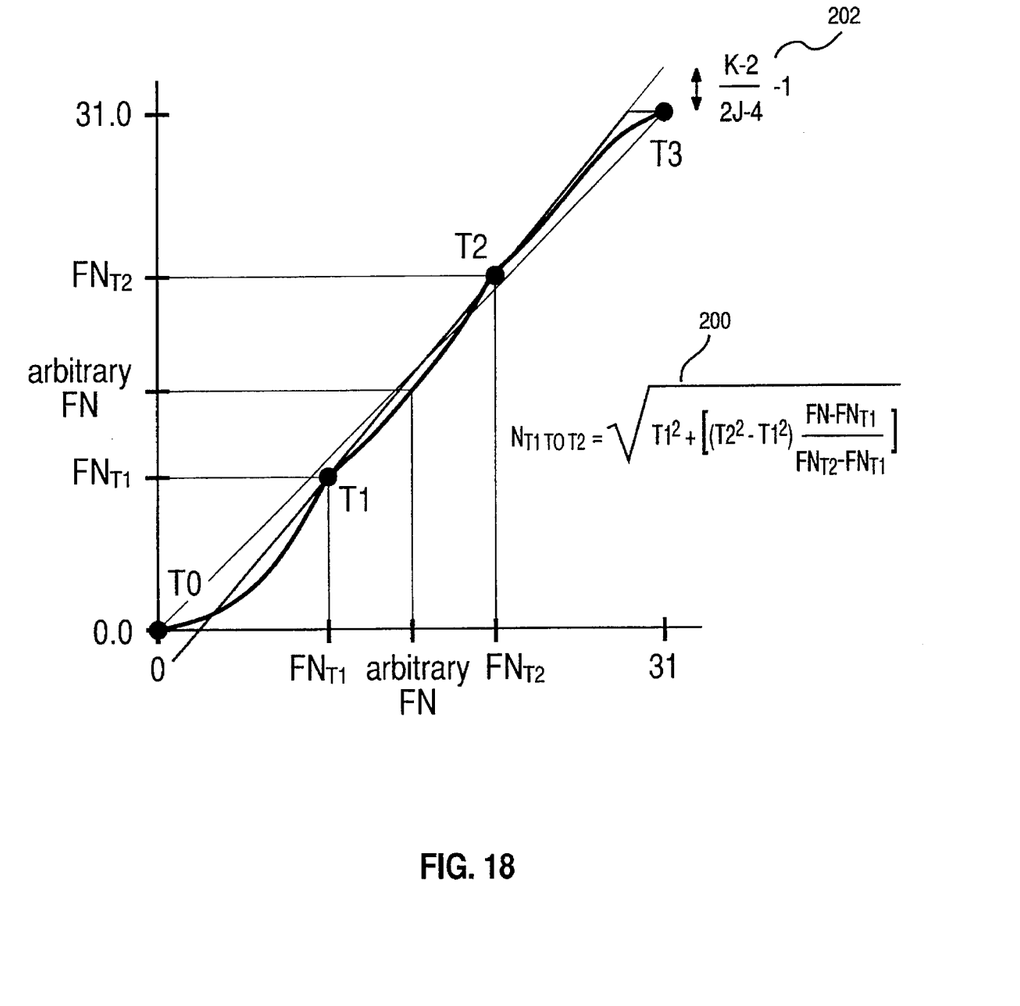
FIG. 18 illustrates a correction technique in accordance with the invention for the desired brightness N in critical color accuracy application.

These two above-noted effects are shown in the illustration of FIG. 18 for a specific case of S=4, C=4, and K=32 (blue). The curve is different for each color, and in general approaches a straight line as S becomes large. Except in critical color matching cases with very few palette colors, these effects can be ignored.

While the invention has been shown and described with reference to particular embodiments thereof, it will be understood by those skilled in the art that the foregoing and other changes in form and detail may be made therein without departing from the spirit and scope of the invention.

I claim:

1. A computerized method for color mapping a digitized image defined by at least a first and second color component, comprising selecting a dither pattern;

selecting complementary dither pattern wherein said dither pattern and said complementary dither pattern define a plurality of pixel pairs, each of said pairs comprised of:

a pixel from said dither pattern defining a pixel value and located at a respective location in said dither pattern; and a complimentary pixel from said complementary dither pattern defining a complementary pixel value and located at a respective location in said complementary dither pattern corresponding to said respective location in said dither pattern; and further wherein the sum of said pixel value and said complementary pixel value for each of said pixel pairs is a constant;

generating an altered first color component from said first color component and said dither pattern; and generating an altered second color component from said second color component and said complementary dither pattern.

2. The method of claim 1 further comprising combining said altered first and altered second color components; and displaying an image comprised of said altered first and altered second color components.

3. The method of claim 1 including determining a luminance and chrominance component from said first and second color components; and selecting a magnitude of said complementary dither pattern to minimize the effect of said dither pattern on said luminance component.

4. A method for mapping a digitized image defined by at least a first, second, and third color component, said method comprising selecting a dither pattern;

generating a complementary dither pattern wherein said dither pattern and said complementary dither pattern define a plurality of pixel pairs, each of said pairs comprised of:
   a pixel from said dither pattern defining a pixel value and located at a respective location in said dither pattern; and
   a complimentary pixel from said complementary dither pattern defining a complementary pixel value and located at a respective location in said complementary dither pattern corresponding to said respective location in said dither pattern; and further wherein sum of said pixel value and said complementary pixel value for each of said pixel pairs is a constant;

generating an altered first color component from said first color component and said dither pattern;

generating an altered second color component from said second color component and said complementary dither pattern; and generating an altered third color component from said third color component and said complementary dither pattern.

5. The method of claim 4 wherein said first, second, and third color components are comprised of green, red, and blue color components, respectively.

6. The method of claim 5 wherein said dither pattern is added to said altered first color.

7. The method of claim 6 wherein said complementary dither pattern is added to said altered second and altered third color components, respectively.

8. Apparatus for color mapping a digitized image defined by at least a first and second color component, comprising means for selecting a dither pattern;

means for selecting a complementary dither pattern wherein said dither pattern and said complementary dither pattern define a plurality of pixel pairs, each of said pairs comprised of:
   a pixel from said dither pattern defining a pixel value and located at a respective location in said dither pattern; and
   a complementary pixel from said complementary dither pattern defining a complementary pixel value and located at a respective location in said complemetary dither pattern corresponding to said respective location in said dither pattern; and further wherein the sum of said pixel value and said complementary pixel value for each of said pixel pairs is a constant;

means for generating an altered first color component from said first color component and said dither pattern; and means for generating an altered second color component from said second color component and said complementary dither pattern.

9. The apparatus of claim 8 further comprising means for combining said altered first and altered second color components; and means for displaying an image comprised of said altered first and second color components.

10. The apparatus of claim 8 including means for determining a luminance component from said first and second color components; and means for selecting a magnitude of said complementary dither pattern to minimize the effect of said dither pattern on said luminance component.

11. Apparatus for mapping a digitized image defined by at least a first, second, and third color component, said apparatus comprising means for selecting a dither pattern;

means for generating a complementary dither pattern wherein said dither pattern and said complementary dither pattern define a plurality of pixel pairs, each of said pairs comprised of:
   a pixel from said dither pattern defining a pixel value and located at a respective location in said dither pattern; and
   a complementary pixel from said complementary dither pattern defining a complementary pixel value and located at a respective location in said complementary dither pattern corresponding to said respective location in said dither pattern; and further wherein the sum of said pixel value and said complementary pixel value for each of said pixel pairs is a constant;

means for generating an altered first color component from said first color component and said dither pattern;

means for generating an altered second color component from said second color component and said complementary dither pattern; and means for generating an altered third color component from said third color component and said complementary dither pattern.

12. The apparatus of claim 11 wherein said first, second, and third color components are comprised of green, red, and blue color components, respectively.

13. The apparatus of claim 12 including means for adding altered first color pattern to said green altered second and altered third color components.

14. The apparatus of claim 13 including means for adding said complementary dither pattern to said altered second and altered third color components.

* * * * *